US006826602B1

(12) United States Patent
Kreiner et al.

(10) Patent No.: US 6,826,602 B1
(45) Date of Patent: Nov. 30, 2004

(54) SYSTEM AND METHOD FOR REVERSE CONTENT DISTRIBUTION

(75) Inventors: Barrett M. Kreiner, Norcross, GA (US); Donna K. Hodges, Cumming, GA (US); Jonathan M. Peterson, Atlanta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 247 days.

(21) Appl. No.: 10/243,347

(22) Filed: Sep. 12, 2002

(51) Int. Cl.[7] ............................................. G06F 13/14
(52) U.S. Cl. ..................................................... 709/219
(58) Field of Search .............................. 709/217, 218, 709/219

(56) References Cited

U.S. PATENT DOCUMENTS

| | | | |
|---|---|---|---|
| 6,591,266 B1 * | 7/2003 | Li et al. ........................ | 707/10 |
| 6,594,260 B1 * | 7/2003 | Aviani et al. ................. | 370/389 |
| 6,598,121 B2 * | 7/2003 | Challenger et al. .......... | 711/122 |
| 6,658,463 B1 * | 12/2003 | Dillon et al. ................. | 709/219 |
| 6,678,693 B1 * | 1/2004 | Shiraishi ...................... | 707/102 |
| 6,751,608 B1 * | 6/2004 | Cohen et al. .................. | 707/3 |

OTHER PUBLICATIONS

Gwertzman, "The Case for Geographical Push–Caching", IEEE, Sep. 1995, p 51–55.*

* cited by examiner

*Primary Examiner*—Kevin L. Ellis
(74) *Attorney, Agent, or Firm*—Woodcock Washburn LLP

(57) ABSTRACT

A proxy server identifies data items on a data server that are infrequently changed. The proxy server receives the infrequently changed data items and stores the data item. The proxy server forwards a copy of the data item to other proxy servers. When a request for the data item is received at the proxy server, a message indicating the request has been received is forwarded to the data server. The proxy server communicates instructions to one of the proxy servers to forward the data item to the requesting machine.

26 Claims, 5 Drawing Sheets

210

Toy Soldier Shop

Title: Union Toy Soldier
Item Number: 1234
Price: $10.00
Units Available: 25

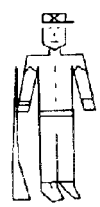
220

These fine hand-crafted toy soldiers commemorate the Union troops of the Civil War. The soldiers are detailed replica's - down to their brass buttons. They are perfect for play or simply for display. They make a great gift for the history buff in the family or for the kid next door!

222

Place Order    Return

Toy Soldier Shop

Title: Union Toy Soldier
Item Number: 1234
Price: $10.00
Units Available: 25

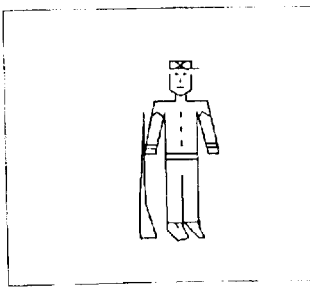
220

These fine hand-crafted toy soldiers commemorate the Union troops of the Civil War. The soldiers are detailed replica's - down to their brass buttons. They are perfect for play or simply for display. They make a great gift for the history buff in the family or for the kid next door!

222

320

Number of items: ☐
Total Price: ☐
Credit Card Number: ☐
Expiration Date: ☐
Visa ○        MasterCard ●
Mailing Address:
☐

Purcahse   Cancel

SYSTEM AND METHOD FOR REVERSE CONTENT DISTRIBUTION

FIELD OF THE INVENTION

The present invention relates generally to computing systems, and more particularly, to systems and methods for data distribution.

BACKGROUND

Significant effort has been devoted to optimizing the operation of large networks such as, for example, wide area networks (WAN's), the Internet, and the World-Wide-Web ("the Web"). To date, however, those efforts have largely been directed at improving the operation of networks from the perspective of consumers of data. For example, in a network such as the Web, when a Web browser issues a request for a Web page, without network optimization it may be necessary to traverse a large portion of the network in order to reach the one Web server on which the requested page exists. Of course, traversing a large portion of the Web can take a relatively long time. One technique for addressing this limitation has been to distribute the same data items on many servers throughout the network. When a request for a distributed data item is made, it is likely that the data item can be accessed quickly without traversing a large portion of the Web.

While efforts have been made to improve the performance of networks for consumers of data, little has been done to address the needs of data providers. Many individuals and small businesses operate their own data servers, which may be, for example, Web servers. These same individuals and small businesses often have limited resources for operating these servers. For example, an individual's or small business' server systems may have limited storage and processing capacity. Also, the network connections maintained by individuals and small businesses often have limited capacity. For example, individuals and small businesses often use digital subscriber lines (DSL) connections, which have a limited capacity for uploading data. This capacity can quickly become saturated, especially when numerous simultaneous data requests are made to the same data server.

SUMMARY

Illustrative systems and methods for distributing data while conserving data content providers' computing resources are disclosed herein. In an illustrative embodiment, a first computing system, which may be referred to as a proxy server, identifies data items located on a data provider's server that are infrequently changed, i.e. static data items. The identification step may be performed in any of numerous different ways including for example, via identification of static data items by the data provider's server, or by searching through the data files on a data provider's server to identify files that have not recently changed. A copy of the data items identified as infrequently changing are communicated from the data provider's server and received at the first computing system. The first computing system forwards copies of the static data items to at least one other computing system, which is is also a proxy server. Thereafter, when a request is received at the first computing system for one of the static data items, a message is sent to the data provider's server indicating that the data item has been requested. The first computing system communicates instructions to the third computing system to forward the data item to the computer system that requested the data item.

BRIEF DESCRIPTION OF THE DRAWINGS

Other features of systems and methods for distributing data are further apparent from the following detailed description of presently preferred exemplary embodiments taken in conjunction with the accompanying drawings, of which:

FIG. 2 is an exemplary Web page comprising data content that may be distributed using systems and methods according to those disclosed herein;

FIG. 3 is an exemplary Web page comprising data content that may be distributed using systems and methods according to those disclosed herein;

DETAILED DESCRIPTION OF THE INVENTION

Exemplary systems and methods for distributing data content are described below with reference to FIGS. 1–5. It will be appreciated by those of ordinary skill in the art that the description given herein with respect to those figures is for exemplary purposes only and is not intended in any way to limit the scope of the invention.

In an illustrative data distribution system, data items that are stored on a data provider's content server and which do not frequently change, i.e. relatively static files, are identified and uploaded to a computing system referred to herein as a proxy server. The proxy server computing system distributes the data items to other proxy server computing systems. When a request for one of the static data items is made to the data provider's content server, it is received first at the proxy server computing system. The proxy server computing system communicates an indication to the content server that the data item has been requested and forwards instructions to one of the plurality of other proxy server computing systems to forward the data item to the computing system that initiated the request.

Figure 1:
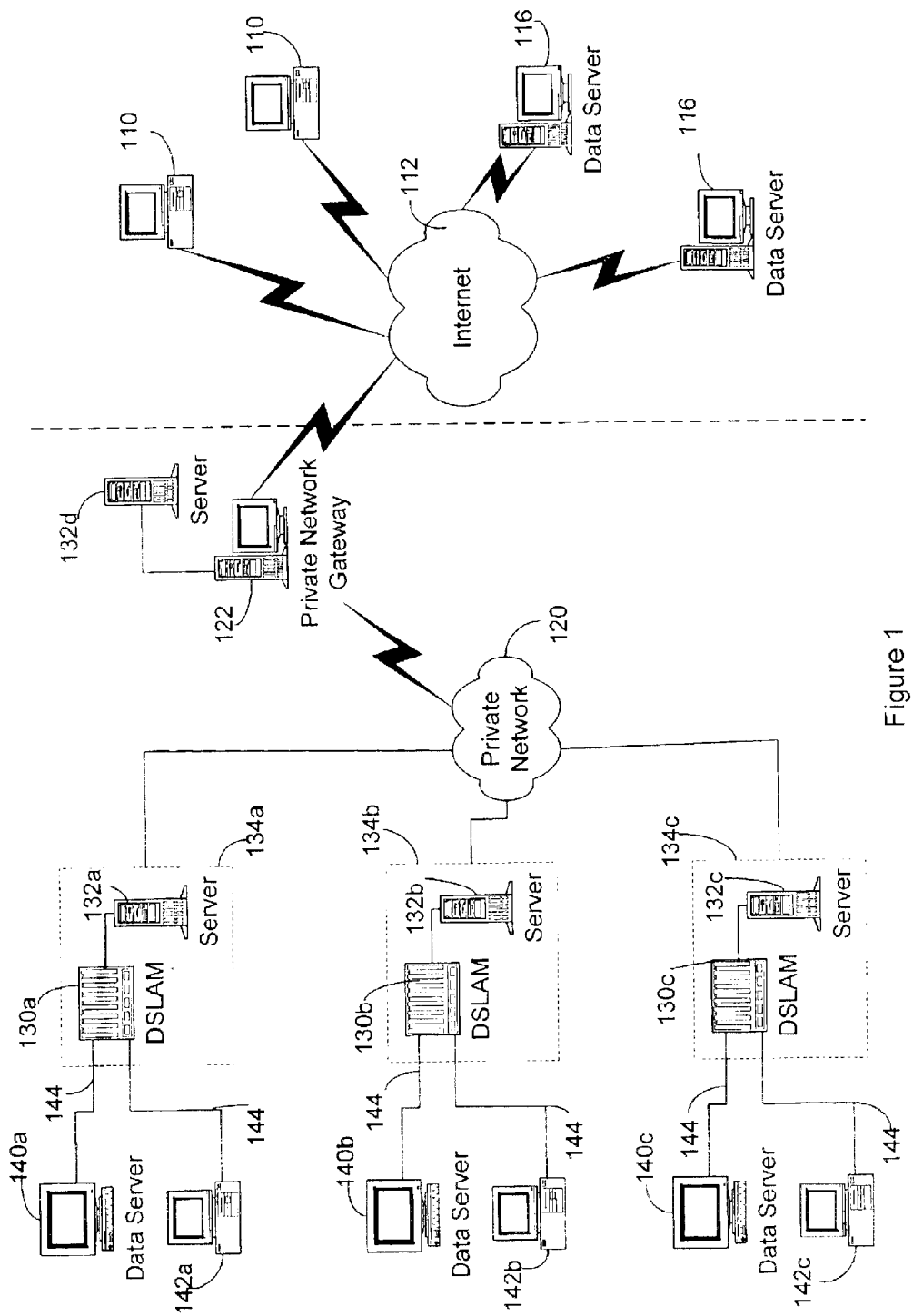
FIG. 1 is a high level diagram of an exemplary network system in which data content is distributed.

FIG. 1 provides a high level diagram of an illustrative network system for distributing data content. As shown, computing systems 110, which may be, for example, personal computers, are operably coupled to Internet 112 and may be used to access data content stored at data servers 116. In an illustrative embodiment, computing systems 110 may have Web browsing software such as, for example, Netscape Navigator, operating thereon and data servers 116 may have Web server software such as, for example, Apache Web Server, operating thereon. Accordingly, in an illustrative embodiment, computing systems 110 may access Web pages stored on data servers 116. Data items such as Web pages may be distributed into Internet 112 and stored on multiple data servers 116 position close to computing systems 110 so as to reduce access times.

Data might also be distributed via private network 120, which is communicatively coupled to Internet 112 via gateway 122. Private network 120 may be a network operated by an organization such as, for example, an Internet service provider (ISP). Further, private network 120 may be, for example, a network operated by a telephone service provider that also provides data services. In an illustrative embodiment, private network 120 is communicatively coupled to a plurality of multiplexing devices 130a, 130b, and 130c, which may be, for example, digital subscriber line access multiplexors (DSLAM's). Multiplexing devices 130a–c are communicatively coupled to proxy servers 132a, 132b, and 132c, which operate as described below to store, and distribute data items. Multiplexing devices 130a–c and proxy servers 132a–c may be co-located at central office (CO) locations 134. Proxy server 132d is communicatively coupled to gateway 122 to provide a data distribution point close to Internet 112. As shown, proxy servers 132a–d are located at the network edge and are therefore close to data content providers as well as consumers of that content.

Small office/home office (SOHO) data servers 140a–c and SOHO computing systems 142a–c are communicatively coupled to DSLAM's 130a–c via digital subscriber lines (DSL) 144. SOHO data servers 144a–c have data stored thereon that may be accessed from data access computing systems 142a–c and 110. In an illustrative embodiment, SOHO data servers 144a–c have Web server software running thereon for serving Web page data, and computing systems 142a–c have Web browser software thereon for viewing Web page data.

Many small businesses that operate out of small offices or home offices have limited resources to devote to data serving capabilities. As a result, many SOHO data servers 140a–c have limited memory and processing capacity. Likewise, DSL lines 144 that provide network coupling have limited capacity for uploading data from data servers 140a–c. For example, many DSL connections have an effective data upload capacity of approximately 128 Kbits/second. As a result of these capacity limitations, data servers 140a–c and DSL lines 144 can easily become saturated during periods of high activity.

According to the illustrative systems and methods disclosed herein, proxy servers 132a–c identify data items stored on data servers 140a–c that do not change frequently, i.e. those data items that are relatively static. These data items are loaded onto proxy servers 132a–d. Thereafter, when the static data items are requested at data access computing systems 142a–c and 110, the data items can be downloaded from proxy servers 132a–d, rather than from SOHO data servers 140a–c. Thus, the number of data requests directly handled by the SOHO servers 140a–c is reduced, as is the data traffic on DSL communication lines 144.

SOHO data servers 140a–c may be used to distribute a wide variety of data. Often, SOHO data servers 140a–c are employed to provide business-related data to potential clients and to facilitate business transactions. For example, many small businesses sell products over the Web and devote their data servers 140a–c to performing these Web transactions. FIG. 2 depicts an exemplary Web page 210 that may be stored on one of SOHO data servers 140a–c. Exemplary web page 210, which can be described in an HTML file, provides product information regarding toy soldiers that are being offered for sale perhaps in connection with a Web site devoted to selling toys. As shown, Web page 210 comprises picture 220 depicting a toy soldier, text description 222, which describes the particular toy soldier model, and buttons 224 for navigating to an order page or returning to a selection listing. In some instances, data items such as Web page 210 of FIG. 2 may not frequently change. Furthermore, Web page 210 does not require any processing logic to be performed on data input on Web page 210. Data items with these characteristics are ideal for being processed and distributed as described below in connection with FIG. 4.

FIG. 3 depicts an exemplary Web page 310 for purchasing the toy soldiers described in Web page 210. As shown, Web page 310, which has a corresponding HTML file, comprises picture 220 and description 222 from Web page 210. Web page 310 further comprises data entry fields 320 for entering information attendant to the transaction such as, for example, the number of items, credit card number, credit card expiration date, credit card company, and mailing address. When a user enters information corresponding to these fields, the information is processed by the SOHO data server 140 that issued the Web page. Because Web page 310 requires processing by the issuing data server 140, the entire file corresponding to Web page 310 is not a good candidate for caching at proxy server 132. However, portions of Web page 310 such as description 222 and picture 210 are likely static and do not involve processing by the issuing computer. According to an aspect of the illustrative embodiment, these static page portions or components, which are referred to herein as edge-side-assets (ESA's), may be cached at proxy servers 132. In such an embodiment, the file corresponding to Web page 310 comprises a command for incorporating the ESA's. For example, an HTML file corresponding to Web page 310 may comprise HTML "include" commands indicating that particular ESA's are to be inserted at an appropriate location when Web page 310 is displayed.

Figure 4:
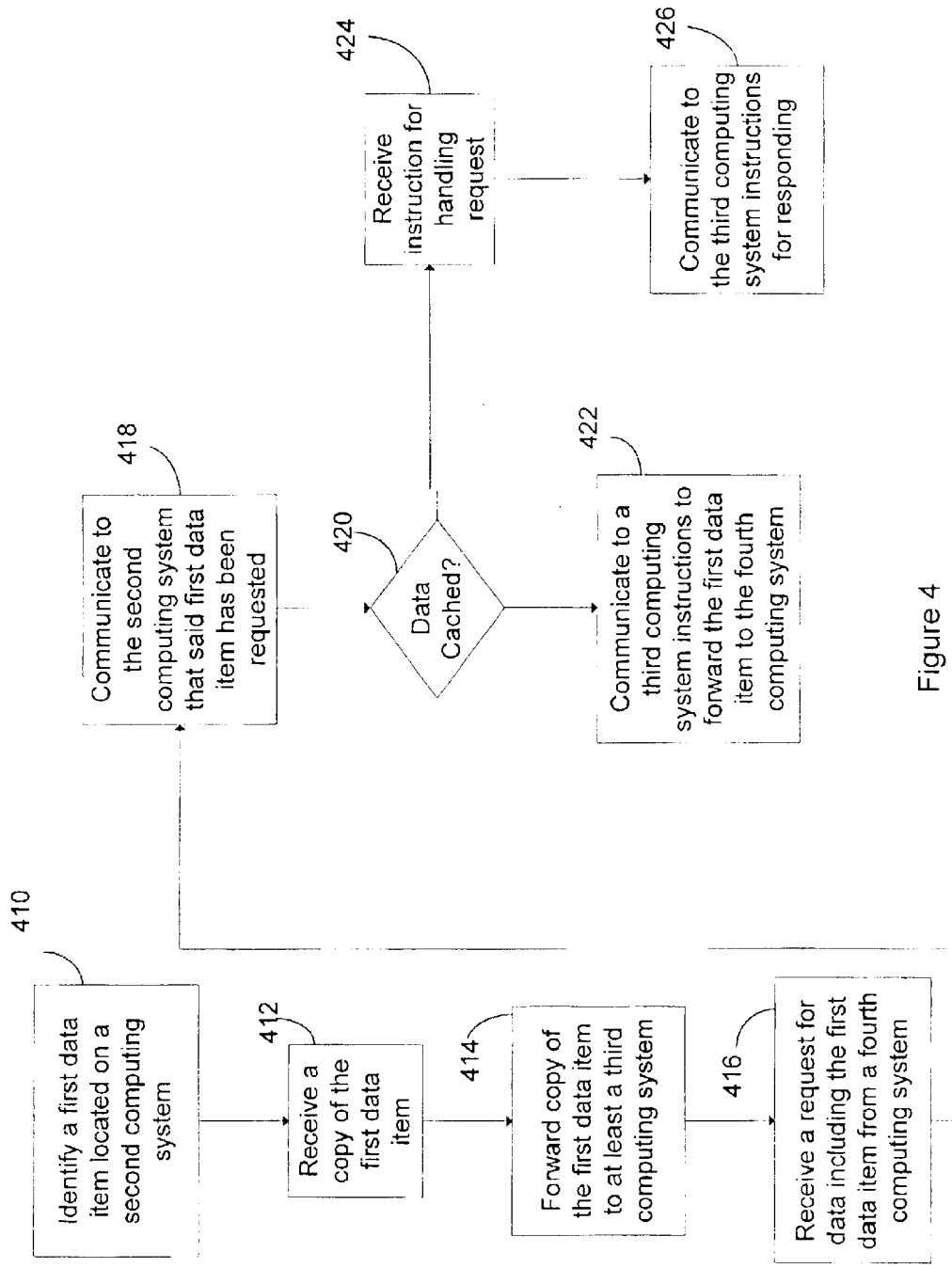
FIG. 4 is a flow chart of an exemplary method for distributing data content.

FIG. 4 is a flow chart depicting an illustrative method for distributing data items. As shown, at step 410, a first computing system identifies a data item that does not frequently change and which is stored on a second computing system. Generally, the first computing system is located at the network edge closest to the second computing system. For example, proxy server 132a may identify a file located on SOHO data server 140a that does not frequently change. The file may correspond, for example, to Web page 210. According to another aspect of the illustrative embodiment, proxy server 132a might also identify that a portion of a Web page such as a picture that is incorporated in a Web page is suitable for caching. For example, proxy server 132a may identify that description 222 and/or picture 220 of Web page 310 do not frequently change. The step of identifying a data file that does not frequently change, or is static, may be performed in any of numerous different ways. For example, SOHO data server 140a may initiate contact with proxy server 132a and identify files that are static. In one embodiment, SOHO data server 140a may establish a connection to proxy server 132a using FTP or another protocol. In an alternative embodiment, data server 140a may upload an index file of static files to proxy server 132a. In another illustrative embodiment, proxy server 132a may actively search the contents of SOHO data server 140a for files that have not recently changed. This may be accomplished, for example, wherein proxy server 132a is exposed to data server's 140a hard disk via network file sharing (NFS), server message block (SMB), or a similar protocol.

At step 412, the computing system that identified the static files that are candidates for caching, receives copies of the static files. For example, proxy server 132a may receive an HTML file corresponding to Web page 210 and any static files such as picture files that are displayed as part of Web page 210. According to another embodiment, where a particular data file is not itself static but incorporates static files, the static files are received at the proxy server 132a. For example, with respect to Web page 310, files comprising picture 220 or text 222 may be received at proxy server 132a. According to an aspect of one exemplary embodiment, the files may have a live-to-date or expiration date that identifies the length of time that the files may be presumed to be valid and presented in response to a data request.

At step 414, proxy server 132a that received the static file(s) transmits a copy of the same files to other proxy servers 132b–d in the network. Thus, the static files are positioned along the network edge where they are close to data access computing systems 142 and 110 that might request the data items.

At step 416, proxy server 132a receives a request from one of data access computing systems 142 or 110 for data including one or more of the data items that are received at step 412. The data request is routed to the proxy server at the edge of the network closest to the data server on which the data originally resides. For example, proxy server 132a may receive a request for Web page 210 wherein the HTML file corresponding to the Web page 210 has been stored on proxy server 132a. Alternatively, proxy server 132a may receive a request for Web page 310 wherein a file corresponding to picture 210 that is displayed as part of Web page 310 is stored on proxy server 132a.

At step 418, proxy server 132a communicates to SOHO data server 140a on which the requested data item is originally stored, that the data item has been requested. For example, in the exemplary scenario is wherein Web page 210 is requested, proxy serve 132a transmits a message to data server 140a indicating that Web page 210 has been requested. This message may be transmitted in the format of an HTTP "head message," for example. According to another exemplary scenario, the requested data file may itself not be static but may comprise or reference a static file. For example, a request may be received at proxy server 132a for Web page 310. An HTML file corresponding to Web page 310 may not be stored on proxy server 132a because the page 310 is not static. However, a file corresponding to picture 220 may be stored on proxy server 132a. Accordingly, at step 418, proxy server forwards the file request to data server 140, wherein the file request implicitly includes an indication that the static data item has been requested.

At step 420, it is determined whether the requested file has been cached at proxy server 132. If so, at step 422, proxy server 132a communicates instruction to one of the other proxy servers 132b–d to forward the requested data item to the requesting computing system. For example, proxy server 132a may communicate instructions to server 132c to forward the file corresponding to Web page 210 to the requesting computing system 142c. In one illustrative embodiment, the instructions are compressed prior to communication.

If at step 420, the requested file was not cached, proxy server 132a waits for and receives instructions, which may be in the form of an HTML file, from data server 140a at step 424. The instructions may comprise an HTML file that includes by reference one or more data items that have been cached. For example, proxy server 132a may receive instructions for creating a Web page such as 310 wherein description 222 and picture 220 have been cached and are included by reference. Specifically, files corresponding to description 222 or picture 220 may be included by reference in the instructions, possibly using an HTML "include" command. At step 426, proxy server 132a forwards the instructions to another proxy server 132c along with additional instructions to forward the assembled data file to computing system 142c.

Figure 5:
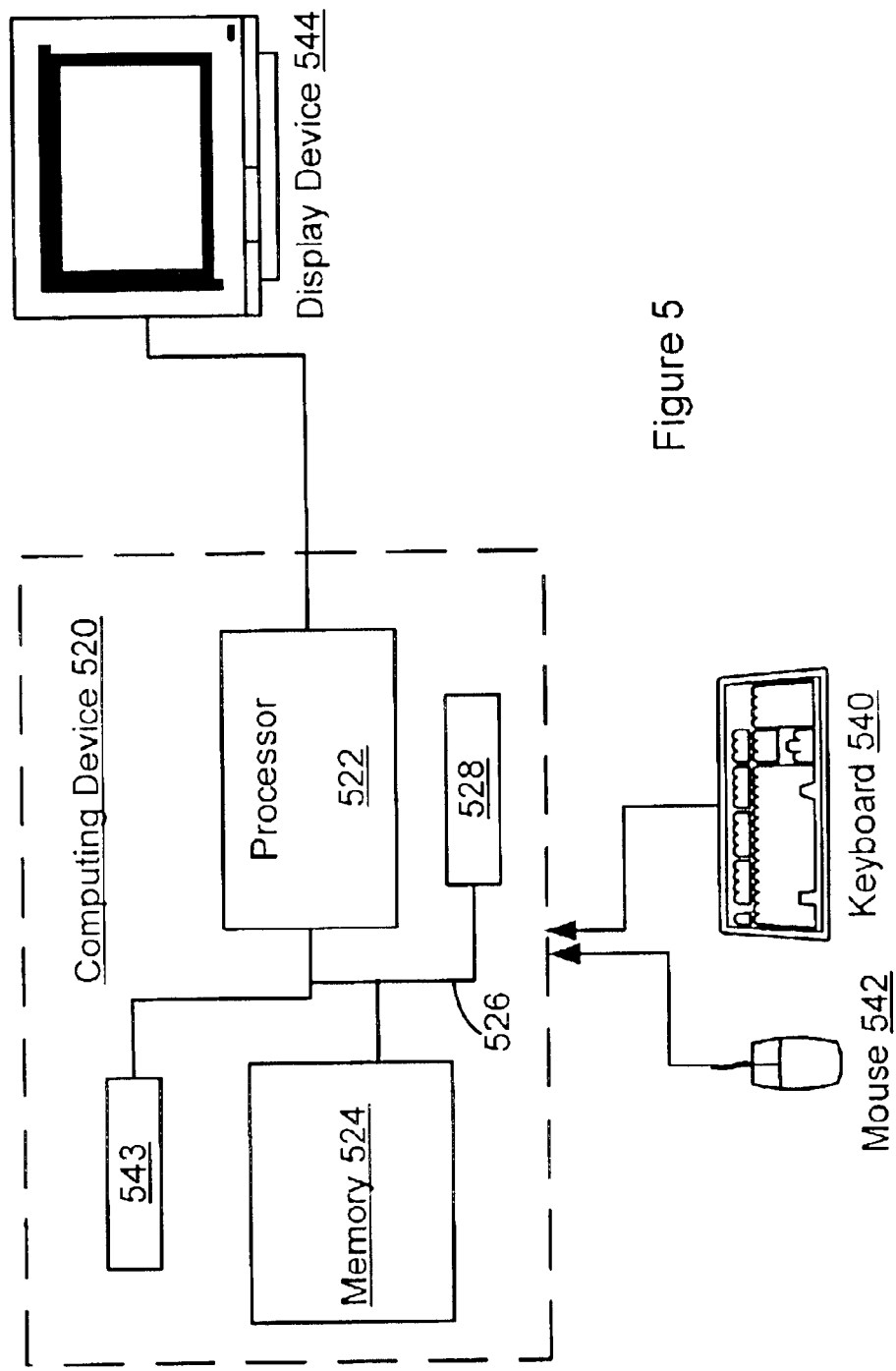
FIG. 5 is a diagram of a computing device operable for use in performing the disclosed method.

FIG. 5 is a diagram of a generic computing device, which may be operable to be used in the above-described network. As shown in FIG. 5, computing device 520 includes processor 522, system memory 524, and system bus 526 that couples various system components including system memory 524 to processor 522. System memory 524 may include read-only memory (ROM) and/or random access memory (RAM). Computing device 520 may further include hard-drive 528, which provides storage for computer readable instructions, data structures, program modules, data, and the like. A user (not shown) may enter commands and information into the computing device 520 through input devices such as keyboard 540 or mouse 542. A display device 544, such as a monitor, a flat panel display, or the like is also connected to computing device 520. Communications device 543, which may be a modem, network interface card, or the like, provides for communications over a network. System memory 524 and/or hard-drive 528 may be loaded with any one of several computer operating systems such as WINDOWS NT operating system, WINDOWS 2000 operating system, LINUX operating system, and the like.

Those skilled in the art understand that computer readable instructions for implementing the above-described processes, such as those described with reference to FIG. 4, can be generated and stored on one of a plurality of computer readable media such as a magnetic disk or CD-ROM. Further, a computer such as that described with reference to FIG. 5 may be arranged with other similarly equipped computers in a network, and each computer may be loaded with computer readable instructions for performing the above-described processes. Specifically, referring to FIG. 5, processor 522 may be programmed to operate in accordance with the above-described processes.

Thus, systems and methods for distributing data while preserving data content provider resources have been disclosed. These novel systems and methods provide for caching static data elements stored on a data server at the network node to which the data server connects. Caching static data items minimizes the number of data accesses that need to be made to the data server. Accordingly, the systems and methods provide efficient data distribution while conserving the limited resources of data content servers.

While systems and methods have been described and illustrated with reference to specific embodiments, those skilled in the art will recognize that modification and variations may be made without departing from the principles described above and set forth in the following claims. For example, while the system has been described as comprising proxy servers 132a–d, much of the functionality described as being provided by proxy servers 132a–d may be incorporated into DSLAM's 130a–c. Furthermore, while the exemplary data items described herein are Web pages, other types of data may similarly be distributed using the illustrative methods and systems. Also, while the cached data items are described as being distributed automatically to all proxy servers, the cached data may be distributed on an as-needed basis as well. Accordingly, reference should be made to the appended claims as defining the scope of the invention.

What is claimed is:

1. A method for servicing data request, comprising:

identifying at a first computing system a first data item stored on a second computing system, said first data item being relatively static;

receiving a copy of said first data item at said first computing system;

forwarding a copy of said first data item to at least a third computing system;

receiving at said first computing system a request for data including said first data item from a fourth computing system;

communicating to said second computing system an indication that said first data item has been requested; and communicating to said at least third computing system instructions to forward a copy of said first data items to said fourth computing system.

2. The method of claim 1, wherein identifying at a first computing system a first data item stored on a second computing system comprises receiving an indication from said second computing system that said first data item infrequently changes.

3. The method of claim 1, wherein identifying at a first computing system a first data item stored on a second computing system comprises searching said second computing system for data items that have not frequently changed.

4. The method of claim 1, wherein receiving a copy of said first data item at said first computing system comprises storing a copy of said first data item at said first computing system.

5. The method of claim 1, wherein said first computing system comprises a server computer, said second computing system comprises a server computer, and said third computing system comprises a server computer.

6. The method of claim 1, wherein said first computing system comprises a machine for multiplexing communication lines.

7. The method of claim 6, wherein said first computing system comprises a DSLAM.

8. The method of claim 6, wherein said at least third computing system comprises a machine for multiplexing communication lines.

9. The method of claim 1, wherein said first computing system comprises a first Web server, said second computing system comprises a second Web server, and said third computing system comprises a Web browser.

10. The method of claim 1, wherein receiving at said first computing system a request for data comprises receiving a request for a Web page.

11. The method of claim 10, wherein communicating to said second computing system an indication that said first data item has been requested comprises communicating an HTTP message.

12. The method of claim 11, wherein communicating an HTTP message comprises communicating a head message.

13. The method of claim 1, wherein said first data item comprises web page.

14. The method of claim 1, wherein said first data item comprises a data file for storing at least one of a picture and text.

15. The method of claim 1, further comprising creating an HTML file with a reference to said first data item.

16. The method of claim 1, wherein communicating to said at least third computing system instructions to forward a copy of said first data items to said fourth computing system comprises forwarding an HTML file to said third computing system.

17. The method of claim 16, further comprising at said third computing system modifying said HTML file to include said first data item.

18. The method of claim 1, wherein said first computing system comprises a DSLAM and a web server.

19. In a network comprising a plurality of computing systems, a method for servicing data request, comprising:

identifying at a first computing system a first data item stored on a second computing system, said first data item being relatively static;

receiving a copy of said first data item at said first computing system;

forwarding a copy of said first data item to a third computing system;

receiving at said first computing system a request for data including said first data item from a fourth computing system;

communicating to said second computing system an indication that said first data item has been requested;

receiving instructions for displaying data, said instructions comprising a reference to said first data item; and forwarding said instructions to said third computing system.

20. The method of claim 19, wherein receiving instructions comprises receiving an HTML file having a reference to said first data item.

21. The method of claim 20, wherein forwarding said instructions comprises forwarding said HTML file.

22. The method of claim 21, further comprising at said third computing system, inserting said first data item into said HTML file.

23. The method of claim 22, further comprising at said third computing system, forwarding said HTML with said first data item inserted therein to said fourth computing system.

24. The method of claim 20, wherein said first data item is referenced in said HTML file as an edge side asset.

25. The method of claim 20, wherein said HTML file comprises an edge side asset include.

26. A method of distributing data, comprising:

at a proxy server identifying data items existing on a data server that are relatively static;

caching the relatively static data items on a proxy server;

distributing the relatively static data items to other proxy servers; and upon receipt of a request for one of the relatively static data items, forwarding instructions to service the request to a proxy server located in close proximity to the machine from which the request originated.

* * * * *